United States Patent
Kanai

(10) Patent No.: US 8,378,539 B2
(45) Date of Patent: Feb. 19, 2013

(54) FLAT VIBRATION MOTOR

(75) Inventor: Naoki Kanai, Ueda (JP)

(73) Assignee: Nidec Semiconductor Corporation, Ueda-shi, Nagano-ken (JP)

( * ) Notice: Subject to any disclaimer, the term of this patent is extended or adjusted under 35 U.S.C. 154(b) by 47 days.

(21) Appl. No.: 12/980,762

(22) Filed: Dec. 29, 2010

(65) Prior Publication Data

US 2011/0260559 A1  Oct. 27, 2011

(30) Foreign Application Priority Data

Apr. 26, 2010 (JP) .................. 2010-100931

(51) Int. Cl.
*H02K 7/06* (2006.01)
(52) U.S. Cl. .................. 310/81; 310/51; 310/40 MM
(58) Field of Classification Search .............. 310/81, 310/89, 67 R, 51, 40 MM; 360/98.07, 99.01, 360/99.04, 99.08
See application file for complete search history.

(56) References Cited

U.S. PATENT DOCUMENTS

2005/0248224 A1* 11/2005 Park, II ............... 310/81
2008/0088191 A1* 4/2008 Park et al. ............ 310/71

FOREIGN PATENT DOCUMENTS

JP  2005-27484 A1  1/2005

* cited by examiner

*Primary Examiner* — Quyen Leung
*Assistant Examiner* — Leda Pham
(74) *Attorney, Agent, or Firm* — Westerman, Hattori, Daniels & Adrian, LLP

(57) ABSTRACT

A flat vibration motor for suppressing deformation of coils even in a reflow at a high temperature, having a stator structure 10 fixing a shaft 1 and having no-core coils $C_1$ and $C_2$; a cover case 20 covered by the stator structure 10 and supporting the other end of the shaft 1; and a rotor frame 30; wherein the stator structure 10 includes: a board 12 having a first face 12a being provided with electrode patterns $E_1$-$E_3$ and a second face 12b being provided with a wiring pattern to be connected to the electrode patterns and to the no-core coils; and a base frame 14 having a burring part 15a into which one end of the shaft 1 is fitted, and being sandwiched between the rotor frame 30 and the upper surfaces of the coils C1 and C2 by abutting against the coils C1 and C2.

12 Claims, 7 Drawing Sheets

FLAT VIBRATION MOTOR

CROSS-REFERENCE TO RELATED APPLICATION

This application is based upon the prior Japanese Patent Application No. 2009-189789, filed on Aug. 19, 2009, and based upon and claims the benefit of priority of the prior Japanese Patent Application No. 2010-100931, filed on Apr. 26, 2010, the entire contents of which are incorporated herein by reference.

BACKGROUND OF THE INVENTION

1. Field of the Invention

The present invention relates to a flat vibration motor built into a mobile phone etc., more particularly relates to a structure of a stator plate for the same.

2. Description of the Related Art

In the past, as a flat vibration motor, for example a brushless motor has been provided with a stainless steel disk shaped base plate on which one end of a shaft is press fitted into a burring part, a stainless steel cover case having a cylindrical shape with a bottom with an open part covered by the base plate and to which the other end of the shaft is fitted in a shaft mounting hole, a rotor frame having an axial direction field type rotor magnet and eccentric weight supported to be able to rotate via a slide bearing through which the shaft runs, and a flexible printed circuit board superposed on the base plate and mounting a plurality of no-core coils, current control IC's, and other electronic devices. The base plate has a plurality of detent torque generating holes around the burring part for avoiding cessation of rotation at the dead points where the rotor magnet cannot be re-driven when energizing the no-core coils is stopped so that the cessation of rotation occurs at the points other than the dead points.

Here, the base plate, for convenience in feeding power to the required interconnect of the flexible printed circuit board, has an ear-shaped power feed terminal mount sticking out from the arc-shaped outer periphery outward in the radial direction. This is electrically connected to a power feed pattern on the device side board mounting this flat vibration motor through this flexible printed circuit board on this power feed terminal mount. Further, the base plate is provided at a plurality of locations with detent torque generating holes. Due to this, there is the problem of entry of solder into these holes, so the plate has mounting legs sticking out from the arc-shaped outer periphery outward in the radial direction and can be fastened to the device side board mounting the flat vibration motor by reflow solder.

As related art, there is Japanese Patent Publication (A) No. 2005-27484 (FIG. 2).

In reflow processing at a high temperature (250° C. for example) when the above flat vibration motor is mounted on the device side board, the shapes of the bobbin-less no-core coils are deformed so that the magnetic flux of the no-core coils will be in disorder and the gaps between no-core coils and the rotor magnet will have various values, resulting in that the yield rate of the flat vibration motor will be greatly reduced.

SUMMARY OF THE INVENTION

In view of the above problem, an object of the present invention is to provide a flat vibration motor in which deformation of the shapes of bobbin-less non-core coils is suppressed even in the reflow processing at a high temperature.

The present invention provides a flat vibration motor provided with a stator structure fixing one end of a shaft and having bobbin-less no-core coils; a cover case having a tubular part, an opening of the tubular part being covered by the stator structure, supporting the other end of the shaft; and a rotor frame having an axial direction field type rotor magnet and an eccentric weight, and being supported to be able to rotate via a slide bearing through which the shaft passes; wherein the stator structure includes: a board having a first face and a second face, the first face being provided with at least one electrode pattern and the second face being provided with a wiring pattern to be connected to the electrode pattern and to the no-core coils; and a base frame having a fixing part for preventing wobbling of the one end, and being sandwiched between the side of the rotor frame opposite to the board and the upper surfaces of the no-core coils by abutting the base frame against the no-core coils.

The base frame is sandwiched by abutting it against the upper surfaces of the no-core coils. Therefore, in the reflow process at a high temperature to mount the flat vibration motor on the board of the device side, the base frame keeps the shapes of the no-core coils so that their shapes are kept better, resulting in that the yield ratio can be boosted. In addition, since the base frame has the fixing part for preventing wobbling of one end of the shaft, it is not necessary to make a hole for inserting the end of the shaft into the board, resulting in that a short circuit through the hole in the reflow processing can be prevented.

Here, it is preferable that the base frame is a flat bottom cylinder having a bottom plate part abutting against the upper surfaces of the no-core coils and a cylinder part flexed from the periphery of the flat bottom plate and fitted into the tubular part in the same direction, the board covering the opening of the cylindrical part. Since the base frame has the cylindrical part, the cylindrical part of the base frame can be fitted into the tubular part of the caver case so that the fitting allowance can be kept wider, resulting in that the base frame can be assembled and fixed easily. In addition, since the board covers the opening of the cylindrical part of the base frame, the inside of the motor can be made as an enclosed structure. The board may be fitted into the tubular part of the cover case by adjusting with the end face of the cylindrical part of the base frame, however, if the board is fitted into the cylindrical part of the base frame, the fitting allowance of the cylindrical part and the tubular part can be kept wider.

The fixing part may be a burring part or a hole for fitting the one end the shaft, or may be a concave part for accommodating a wobble preventing circular body into which the one end the shaft is inserted.

According to the present invention, a flat vibration motor able to suppress deformation of bobbin-less no-core coils even in a reflow at a high temperature can be provided.

BRIEF DESCRIPTION OF THE DRAWINGS

These and other objects and features of the present invention will become clearer from the following description of the preferred embodiments given with reference to the attached drawings, wherein:

FIG. 10 is its bottom view;

FIG. 2A is a plan view showing a stator structure used in the flat vibration motor, while

FIG. 3A is a perspective view showing a magnetic base frame used in the stator structure, while

FIG. 5A is a perspective view of the appearance of a coil bracing and wobbling prevention bracing used in the flat vibration motor, while

DESCRIPTION OF PREFERRED EMBODIMENTS

Figure 1A:
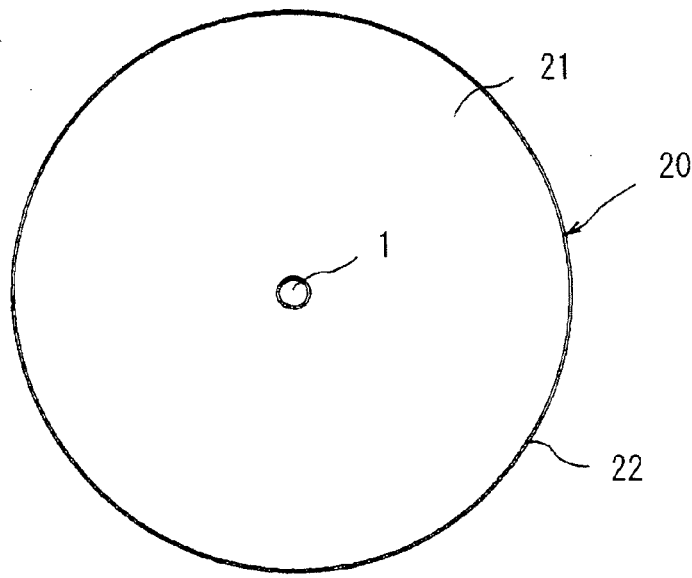
FIG. 1A is a perspective view of the appearance of a flat vibration motor according to an embodiment 1 of the present invention.

Preferred embodiments of the present invention will be described in detail below while referring to the attached figures.

Embodiment 1

The flat (coin type) vibration motor of this example is a brushless motor. As shown in FIG. 1, this is provided with a stator structure 10 in which one end of a shaft 1 is fitted, a stainless steel cover case 20 of cylindrical shape with a flat bottom having a flat bottom part 21 which has a burring part 21a in which the other end of the shaft 1 is fitted, and a rotor frame 30 having an axial direction field type rotor magnet 32 and an arc-shaped eccentric weight 33, and being supported to be able to rotate via a slide bearing (radial bearing) 31 through which the shaft 1 passes.

Figure 3A:
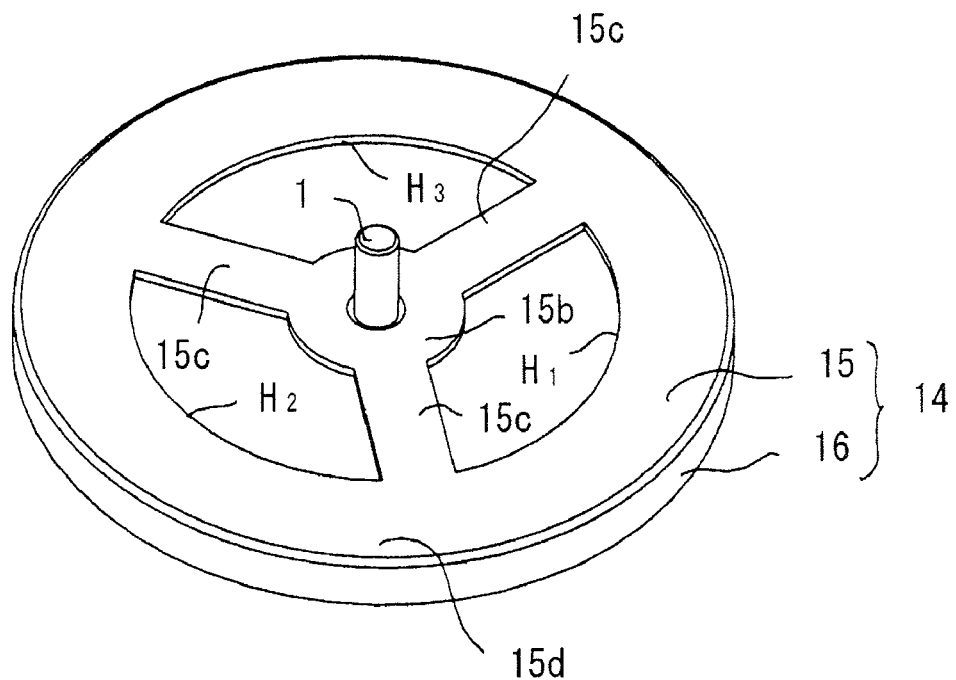
Figure 3B:
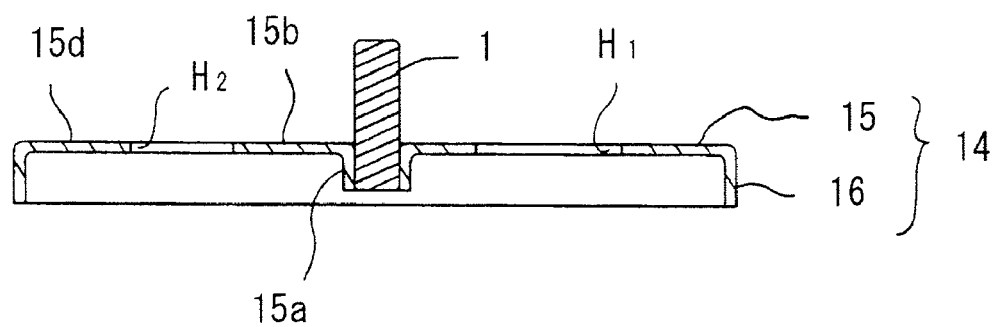
FIG. 3B is its bottom view.

The stator structure 10 of this example is a sandwich structure having later-described onboard parts sandwiched between a both-side printed circuit board 12 and a (stainless-steel) base frame 14 made of magnetic material. The back face (the first face) 12a of the both-side printed circuit board 12 has, as shown in FIG. 10, a central circular shaped first electrode pattern $E_1$ for soldering by reflow process on a device side board such as a mobile phone side, a second electrode pattern $E_2$ and a third electrode pattern $E_3$ of annular shapes and double concentric circles arranged on the circumference of the first electrode pattern $E_1$. The front face (the second face) 12b of the both-side printed circuit board 12 has a wiring pattern (not shown) to be connected to the first to third electrode patterns $E_1$-$E_3$ via through holes (not shown) and to be connected to electronic parts D such as no-core coils $C_1$ and $C_2$, a commutation control IC, a hole device, a capacitor or the like. The base frame 14 is, as shown in FIG. 3, a flat bottom flat cylinder having a flat bottom part 15 with a burring part 15a into which one end of the shat is fitted, and a cylinder part 16 flexed from the periphery of the flat bottom plate 15. The flat bottom plate 15 has three detent torque generating fan-shaped holes $H_1$-$H_3$ around the periphery of the burring part 15a. The detent torque generating fan-shaped holes $H_1$-$H_3$ are formed as compartments surrounded by a central part 15b with the burring part 15a, spoke parts 15c extended from the central part 15b and an outer periphery part 15d The cylindrical part 16 of the base frame 14 is fitted into a tubular part 23 of the caver case 20, wherein the opening of the cylindrical part 16 and the opening of the tubular part 23 are arranged in the same direction. The opening of the cylindrical part 16 is closed up by the both-side printed circuit board 12. The fitting of the cylindrical part 16 into the tubular part 16 may be press fitted or fitted by welding. The opening of the cylindrical part 16 may be closed up by the both-side printed circuit board 12 by coating adhesive material on the opening of the cylindrical part 16. The base frame 14 is sandwiched between the side of the rotor magnet 32, which is opposite to the side of the both-side printed circuit board 12, and the upper surfaces of the no-core coils $C_1$ and $C_2$ by abutting the base frame 14 against the no-core coils C1 and C2. With respect to the no-core coil $C_1$, its no-core part is not covered by the flat bottom plate 15 and it abuts against the central part 15b, the spoke part 15c and the outer peripheral part 15c which form the detent torque generating fan-shaped hole $H_1$ as a compartment. With respect to the no-core coil $C_2$, a portion of its no-core part is covered by the spoke part 15c which forms the detent torque generating fan-shaped hole $H_3$ as a compartment, and it also abuts against the central part 15b, the spoke part 15c and the outer peripheral part 15d.

Note that, on the central part 15b, a resin washer W for receiving the slide bearing 31 is fitted around the shaft 1, however, in pace of the resin washer W, a sheet for covering the detent torque generating fan-shaped holes $H_1$-$H_3$ may cover the whole surface of the flat bottom part 15. By this, a rotor room 40 can be made to be airproof so that fly gas of grease coated on the slide bearing 31 can be trapped in it.

The base frame 14 of this example is made of stainless-steel weekly magnetic material so that, when no-core coils $C_1$ and $C_2$ are in the exciting state, the influence of the detent torque generating fan-shaped holes $H_1$-$H_3$ is very low, resulting in that the base frame 14 functions repulsion or attraction on the rotor magnet 32, however, when electricity is not conducted through the no-core coils $C_1$ and $C_2$, only the magnetic force from the rotor magnet 32 appears so that the large detent torque generating fan-shaped holes $H_1$-$H_3$ generate detent torque on the rotor magnet 32 itself, resulting in that the cessation of rotation occurs at a point other than the dead points.

In this example, the base frame 14 having the detent torque generating fan-shaped holes $H_1$-$H_3$ is arranged on the side of the rotor magnet 32 and is sandwiched between the side of the rotor magnet 32, which is opposite to the side of the both-side printed circuit board 12, and the upper surfaces of the no-core coils $C_1$ and $C_2$ by abutting the base frame 14 against the no-core coils C1 and C2. Therefore, in the reflow process at a high temperature to mount the flat vibration motor on the board of the device side, the base frame 14 keeps the shapes of the no-core coils $C_1$ and $C_2$ so that their shapes are kept better, resulting in that the yield ratio can be boosted. In addition, since a conventional board can be used as the both-side printed circuit board 12, reducing the cost can be realized. Further, since the base frame 14 has the burring part 15a for preventing wobbling of one end of the shaft 1, it is not necessary to make a hole, for inserting the end of the shaft 1, through the both-side printed circuit board 12, resulting in that a short circuit through the hole in the reflow processing can be prevented.

The base frame 14 is a flat bottom cylinder having a flat bottom part 15 abutting against the upper surfaces of the no-core coils $C_1$ and $C_2$, and a cylinder part 16 flexed from the periphery of the flat bottom plate 15 and fitted into a tubular part 22 of the cover case 20 in the same direction. In addition, the both-side printed circuit board 12 covers the opening of the cylindrical part 16 of the base frame 14. By fitting the cylindrical part 16 of the base frame 14 into the tubular part 22, a fitting allowance can be kept so that the base frame 14 can be easily assembled and fixed. Further, since the both-side printed circuit board 12 covers the opening of the cylindrical part 16 of the base frame 14, the inside of the motor can be made as an enclosed structure. The both-side printed circuit board 12 may be fitted into the tubular part 22 of the cover case 20 by adjusting with the end face of the cylindrical part 16 of the base frame 14, however, if the both-side printed circuit board 12 is fitted into the cylindrical part 16 of the base frame 14, the fitting allowance of the cylindrical part 16 and the tubular part 22 can be kept wider.

The flat bottom part 15 of the base frame 14 has the burring part 15a with a through hole, and the end face of the burring part 15a abuts against the second face 12b of the both-side printed circuit board 12. Therefore, the fit depth along the burring part 15a of the shaft 1 can be kept so that the fixing degree can be increased and the degree of perpendicularity of the shaft can be improved. Further, since the flat bottom part 15 is a positioning spacer for determining the distance between the base frame 14 and the both-side printed circuit board 12, assembling can be easy.

Note that it is not necessary to provide the conventional ear-shaped power feed terminal mount sticking out to the base plate so that the area occupied for mounting the flat vibration motor on the board of the device side can be reduced.

Embodiment 2

Figure 1B:
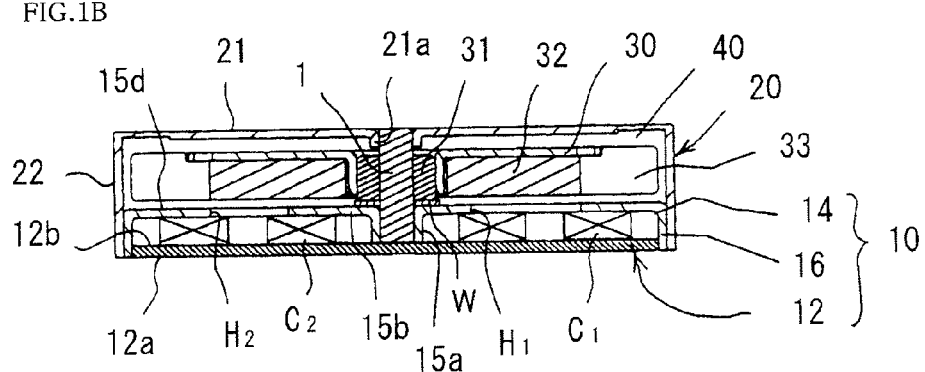
FIG. 1B is its cross-sectional view.
Figure 1C:
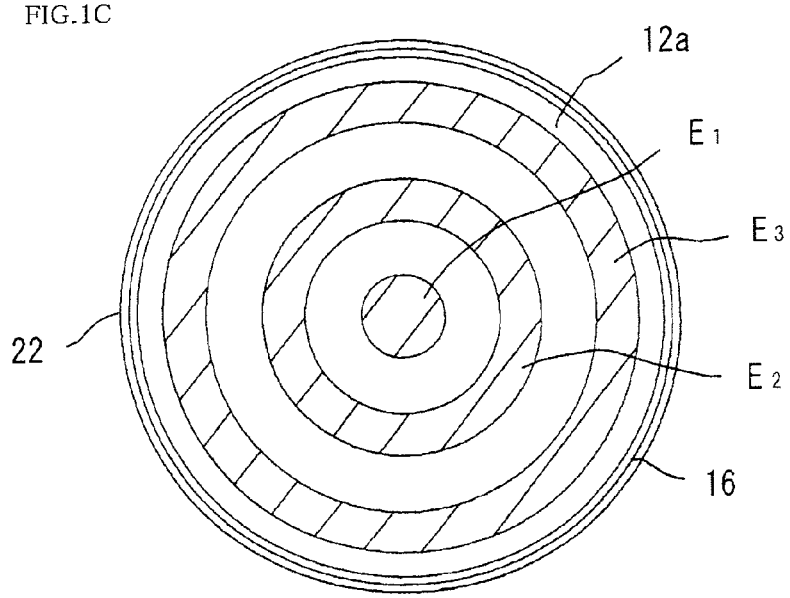
Figure 2A:
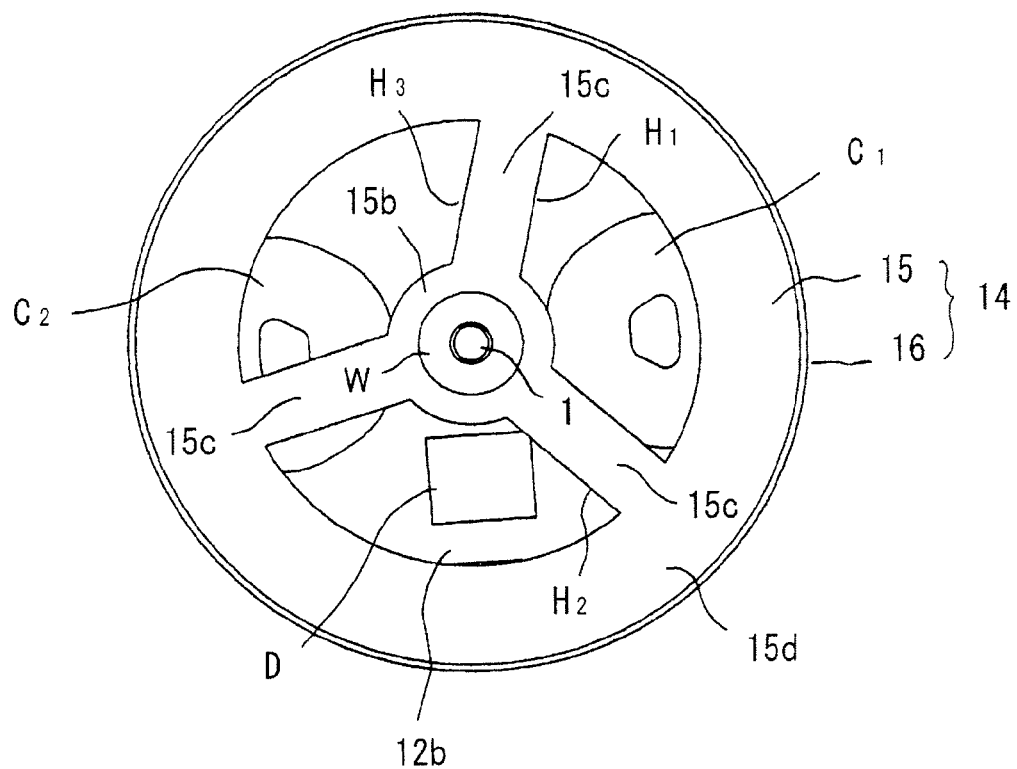
Figure 2B:
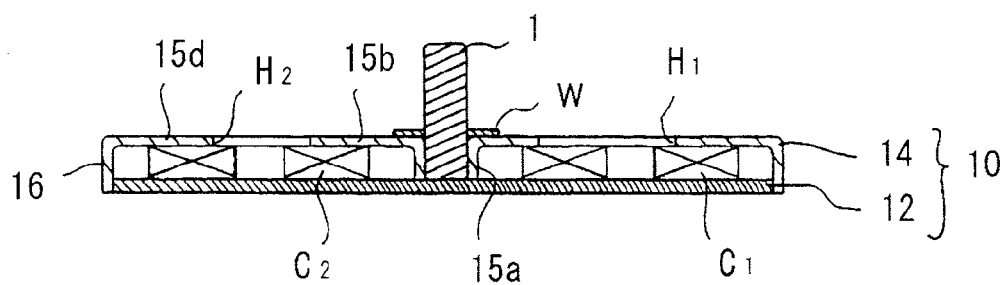
FIG. 2B is its cross-sectional view.
Figure 4A:
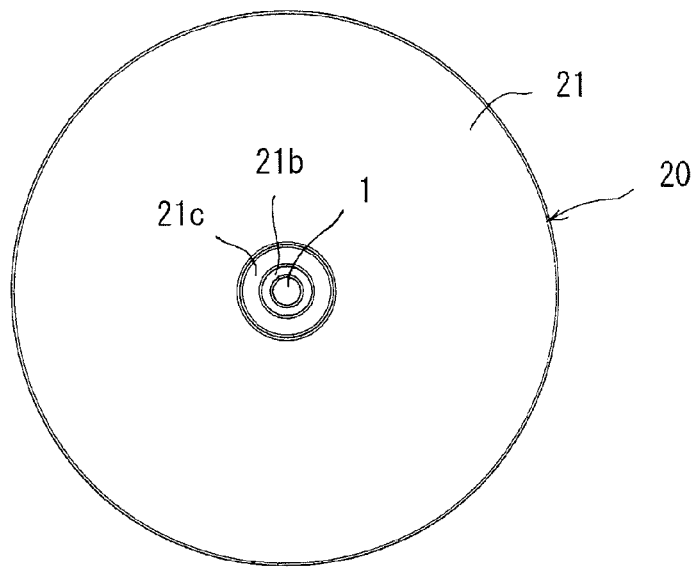
FIG. 4A is a perspective view of the appearance of a flat vibration motor according to an embodiment 2 of the present invention.
Figure 4B:
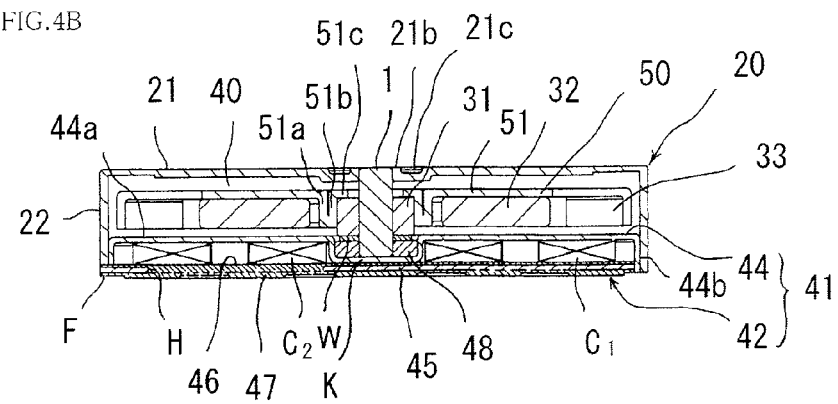
FIG. 4B is its cross-sectional view.

In FIGS. 4A-4B, parts the same as parts shown in FIGS. 1A-1C are assigned the same reference numerals and explanations thereof are omitted here. The flat (coin type) vibration motor of this example is also a brushless motor and is provided with a stator structure 41 fixing one end of a shaft 1, a stainless steel cover case 20 of cylindrical shape with a flat bottom having a flat bottom part 21 which has a burring part 21b fitting or supporting the other end of the shaft 1, and a rotor frame 50 having an axial direction field type rotor magnet 32 and an arc-shaped eccentric weight 33 supported to be able to rotate via a slide bearing (radial bearing) 31 through which the shaft 1 passes.

The center of the flat bottom part 21 of the stainless steel caver case 20 is a shallow ring groove 21c. The flat burring part 21b is formed on the central part of the ring groove 21. The burring part 21b rises up in the direction opposite to the direction of the burring part 21a shown in FIG. 1B in such a way that it rises up from the inside of the ring groove 21c so that the base of the burring part 21b is robust and the grip force for the shaft 1 is strong. Note that the burring part 21b can be formed by providing a ring concave portion on the flat bottom part 21 and by drilling a pilot hole in it.

Figure 4C:
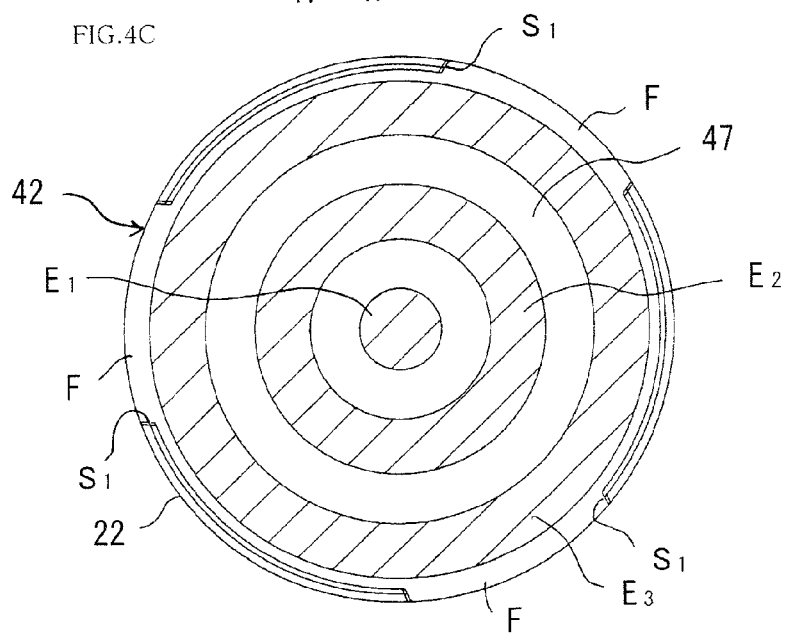
FIG. 4C is its bottom view.

The stator structure 41 of this example is also a sandwich structure having later-described onboard parts sandwiched between a generally circular shaped stator plate 42 and a base frame 44. The stator plate 42 is a laminated body including a generally circular shaped stainless-steel magnetic metal plate 45 having three detent torque generating fan-shaped holes H around its center, a first electric insulating film 46 formed at the front surface (inner surface) side of the magnetic metal plate 45, and a second electric insulating film 46 formed at the back surface (outer surface) of the magnetic metal plate 45. The first electric insulating film 46 and the second electric insulating film 47 are pasted together within the detent torque generating fan-shaped holes H. The second electric insulating film 47 has, as shown in FIG. 4C, a central circular shaped first electrode pattern $E_1$ for soldering by reflow process on a device side board such as a mobile phone side, a second electrode pattern $E_2$ and a third electrode pattern $E_3$ of annular shapes and double concentric circles. The first electric insulating film 46 has a wiring pattern (not shown) to be connected to the first to third electrode patterns $E_1$-$E_3$ via through holes (not shown) and to be connected to electronic parts such as no-core coils $C_1$ and $C_2$, a commutation control IC, a hole device, a capacitor or the like. The stator plate 42 has projected pieces F on three sides fitted into notches $S_1$ which are provided at the lower end of the tubular part 22 of the caver case 20.

Figure 5A:
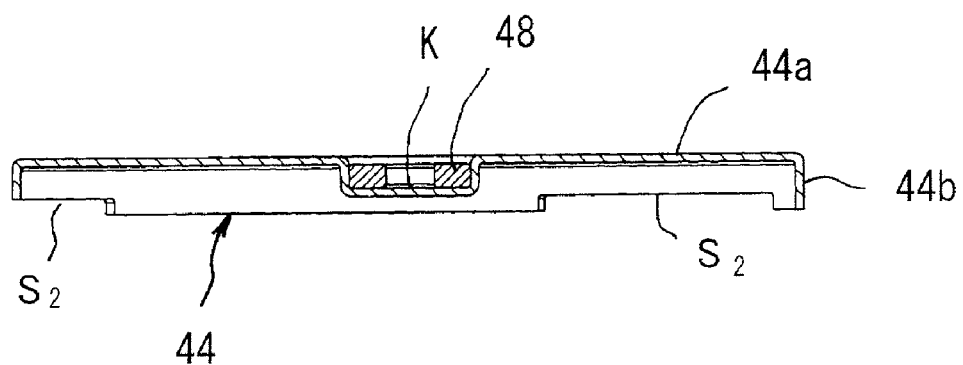
Figure 5B:
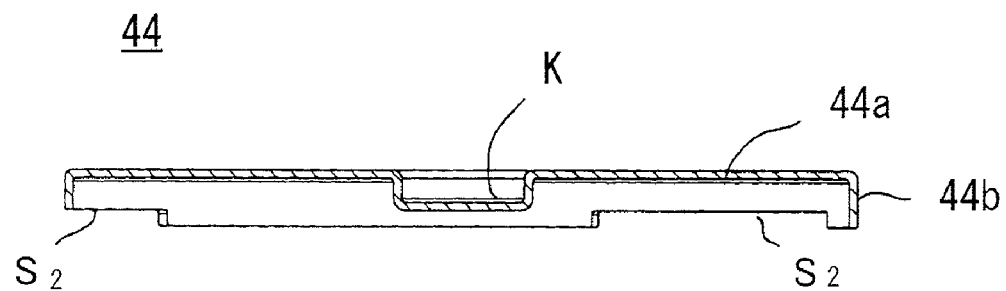
FIG. 5B is a cross-sectional view showing the coil bracing.

The base frame 44 has a flat cylindrical shape fitted into the opening of the tubular part 22 of the caver case 20 and has, as shown in FIGS. 5A and 5B, a flat bottom part 44a having a circular concave part K for accommodating a wobble preventing circular body 48 into which one end of the shaft 1 is inserted, and a cylindrical part 44b flexed from the periphery of the flat bottom plate 44a. At the lower end of the cylindrical part 44b, a notch $S_2$ for fitting the three sides projected pieces F is formed. Between the wobble preventing circular body 48 and the lower end of the slide bearing 31, a resin washer W is intervened. In this structure, one end of the shaft 1 is not abutting against the stator plate 42.

The rotor frame 50 in this example also has a flat cylindrical shape having a flat bottom part 51 with a center being a bearing housing part. This bearing housing part includes an outer cylindrical part 51a rising up from the flat bottom part 51, a burring part 51b flexed from the lower end of the outer cylindrical part 51a to its inside and rising up in contact with the outer cylindrical part 51a, and an inner circumference flange 51c projected to the inside at the upper end of the burring part 15a. A bearing 31 is fitted in the burring part 51b, however, since the end face of the bearing 31 abuts against the inner circumference flange 51c, loosing or dropping out of the bearing 31 can be suppressed in comparison with the case of the first embodiment. Note that the burring part 51b also can be formed by providing a ring concave portion on the flat bottom part 51 and by drilling a pilot hole in it.

In this example, the no-core coils $C_1$ and $C_2$ are sandwiched between the stator plate 42 and the base frame 44. Therefore, in the reflow process at a high temperature to mount the flat vibration motor on the board of the device side, the base frame 44 keeps the shapes of the no-core coils $C_1$ and $C_2$ so that their shapes are kept better, resulting in that the yield ratio can be boosted. In addition, since a rotor room 40 can be air tight by this base frame 44 so that fly oil of grease coated on the slide bearing 31 can be confined in the rotor room 40. Further, since the cylindrical part 44b of the base frame 44 is fitted into the tubular part 22 of the caver case 20, the fitting allowance can be kept wider so that they can be assembled and fixed by swaging or adhesive.

Embodiment 3

Figure 6A:
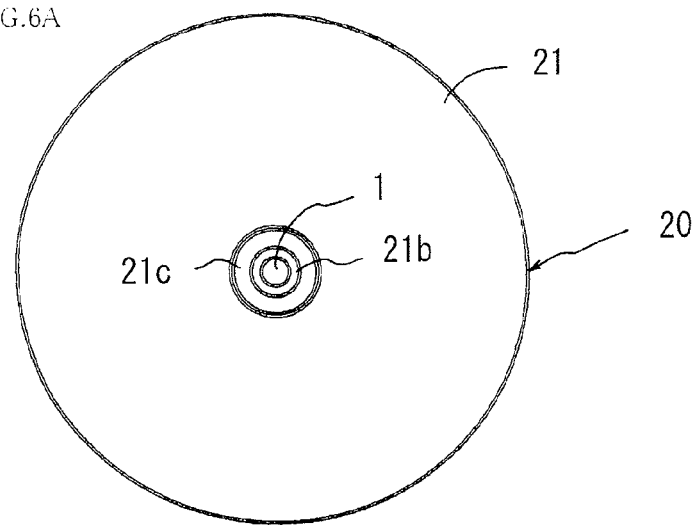
FIG. 6A is perspective view of the appearance of a flat vibration motor according to an embodiment 3 of the present invention.
Figure 6B:
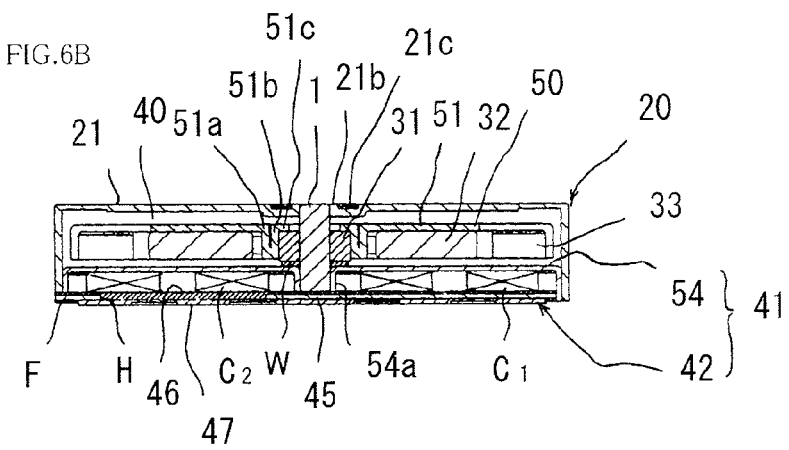
FIG. 6B is its cross-sectional view.
Figure 6C:
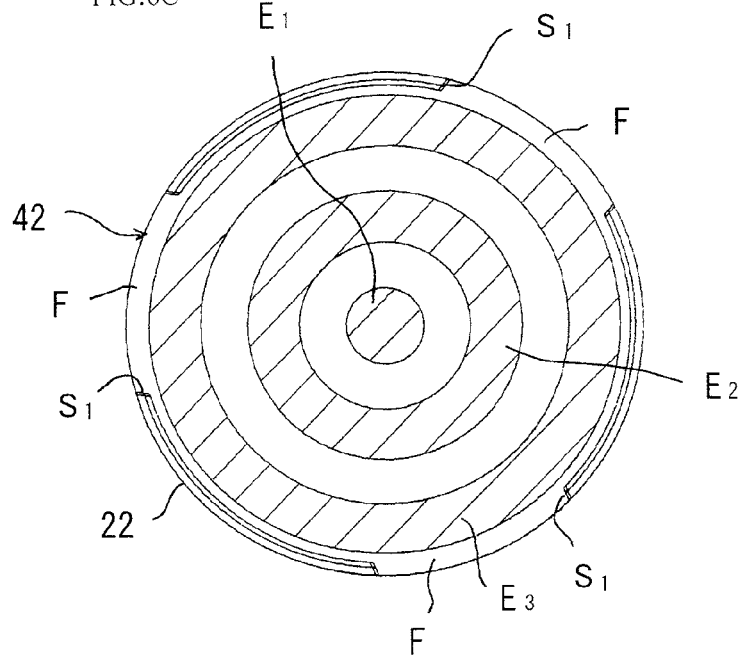
FIG. 6C is its bottom view.

In FIGS. 6A-6C, arts the same as parts shown in FIGS. 4A-4C are assigned the same reference numerals and explanations thereof are omitted here. In the flat (coin type) vibration motor of this example, the point different from the vibration motor shown in FIGS. 4A-4C resides in a base frame 54. This base frame 54 has, as is the same as the base frame 14 shown in FIGS. 1A-1C, a burring part 54a. One end of the shaft 1 is inserted into the burring part 54a. The preventing wobbling of one end of the shaft 1 is realized by the burring part 54a.

Embodiment 4

Figure 7A:
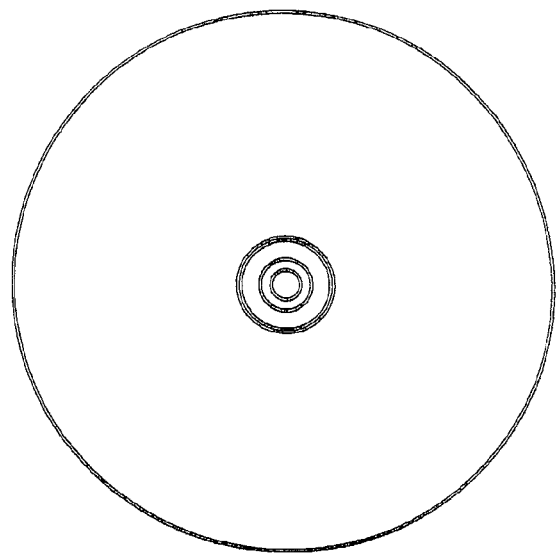
FIG. 7A is a perspective view of the appearance of a flat vibration motor according to an embodiment 4 of the present invention.
Figure 7B:
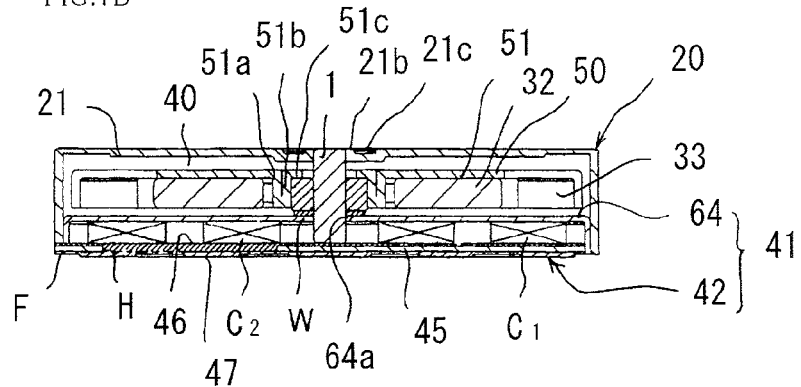
FIG. 7B is its cross-sectional view.
Figure 7C:
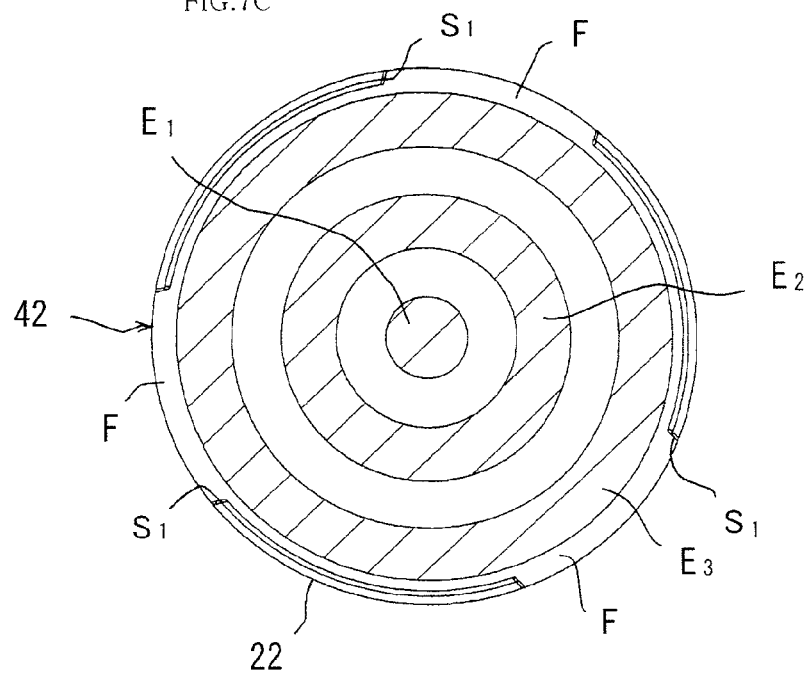
FIG. 7C is its bottom view.

In FIGS. 7A-7C, parts the same as parts shown in FIGS. 4A-4C are assigned the same reference numerals and explanations thereof are omitted here. In the flat (coin type) vibration motor of this example, the point different from the vibration motor shown in FIGS. 4A-4C resides in a base frame 64. This base frame 64 has a shaft hole 64*a*. One end of the shaft 1 is inserted into the shaft hole 64*a*. The preventing wobbling of one end of the shaft 1 is realized by the shaft hole 64*a*.

While the invention has been described with reference to specific embodiments chosen for purpose of illustration, it should be apparent that numerous modifications could be made thereto by those skilled in the art without departing from the basic concept and scope of the invention.

The invention claimed is:

1. A flat vibration brushless motor comprising: a stator structure fixing one end of a shaft and having bobbin-less no-core coils; a cover case having a tubular part, an opening of said tubular part being covered by said stator structure, supporting the other end of said shaft; and a rotor frame having an axial direction field type rotor magnet and an eccentric weight, and being supported to be able to rotate via a slide bearing through which said shaft passes; wherein said stator structure includes: a board having a first face and a second face, said first face being provided with at least one electrode pattern and said second face being provided with a wiring pattern to be connected to said electrode pattern and to said no-core coils; and a base frame having a fixing part for preventing wobbling of said one end, and being sandwiched between the side of said rotor frame opposite to said board and upper surfaces of said no-core coils by abutting said base frame against said no-core coils.

2. The flat vibration motor as set forth in claim 1, wherein said base frame is a flat bottom cylinder having a bottom plate part abutting against the upper surfaces of said no-core coils and a cylindrical part flexed from a periphery of said flat bottom plate and fitted into said tubular part in the same direction, said board covering the opening of said cylindrical part.

3. The flat vibration motor as set forth in claim 1, wherein said board is fitted into a cylindrical part.

4. The flat vibration motor as set forth in claim 2, wherein said fixing part is a burring part for fitting said one end.

5. The flat vibration motor as set forth in claim 2, wherein said fixing part is a hole into which said one end is inserted.

6. The flat vibration motor as set forth in claim 2, wherein said fixing part is a concave part for accommodating a wobble preventing circular body into which said one end is inserted.

7. A flat vibration brushless motor comprising:
a shaft;
a stator structure comprising:
a base frame to fix one end of the shaft, the base frame having a cylindrical part extending downward;
bobbin-less no-core coils provided below the base frame;
a board provided at the cylindrical part to enclose the bobbin-less no-core coils, the board having a first face and a second face, said first face being provided with at least one electrode pattern and said second face being provided with a wiring pattern to be connected to said electrode pattern and said no-core coils; and
a rotor frame provided above the stator structure, the rotor frame comprising an axial direction field type rotor magnet and an eccentric weight, the rotor frame rotating via a slide bearing through which the shaft passes; and
a cover case enclosing the rotor frame, the cover case having a tubular part, a bottom part, and an opening closed by the stator structure, wherein the cover case supports the other end of the shaft; and
wherein the base frame is positioned between the no-core coils and the rotor frame, and the base frame abuts the no-core coils.

8. The flat vibration brushless motor as set forth in claim 7, wherein the base frame (14) has a bottom plate part abutting against upper surfaces of said no-core coils and the cylindrical part flexed from a periphery of said flat bottom plate, wherein the base frame is fitted into a tubular part of the cover case, said board covering an opening of the cylindrical part.

9. The flat vibration brushless motor as set forth in claim 7, wherein said board is fitted into a cylindrical part.

10. The flat vibration brushless motor as set forth in claim 7, wherein the base frame has a fixing part of a burring part for fitting said one end.

11. The flat vibration brushless motor as set forth in claim 10, wherein said fixing part is a hole into which said one end is inserted.

12. The flat vibration brushless motor as set forth in claim 10, wherein said fixing part is a concave part for accommodating a wobble preventing circular body into which said one end is inserted.

* * * * *